Sept. 10, 1935.  A. H. R. FEDDEN ET AL  2,014,317
SUPERCHARGED INTERNAL COMBUSTION ENGINE
Filed Aug. 20, 1934  2 Sheets-Sheet 1
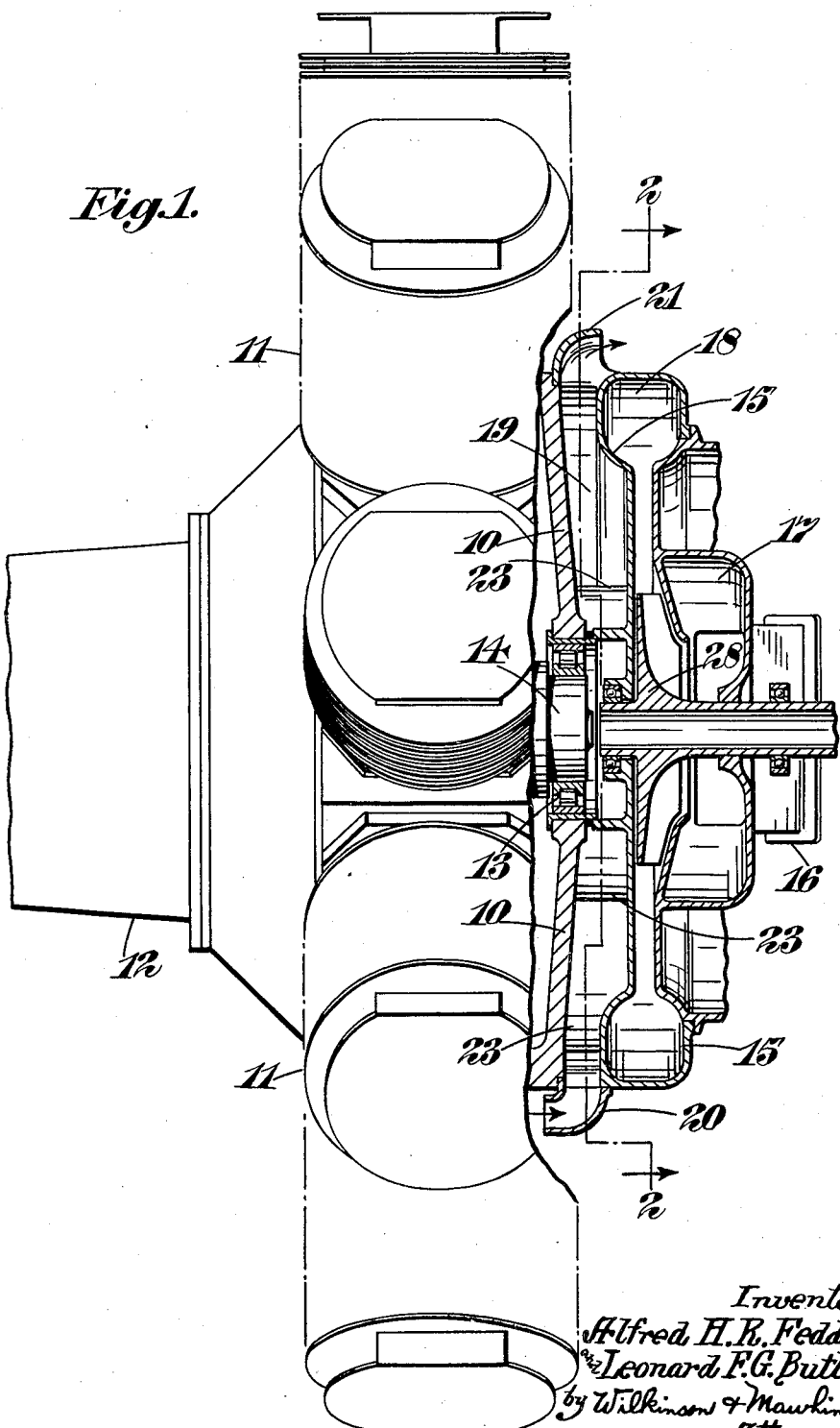
Inventors
Alfred H. R. Fedden
Leonard F. G. Butler
by Wilkinson & Mawhinney
Attorneys.

Sept. 10, 1935. A. H. R. FEDDEN ET AL 2,014,317
SUPERCHARGED INTERNAL COMBUSTION ENGINE
Filed Aug. 20, 1934 2 Sheets-Sheet 2
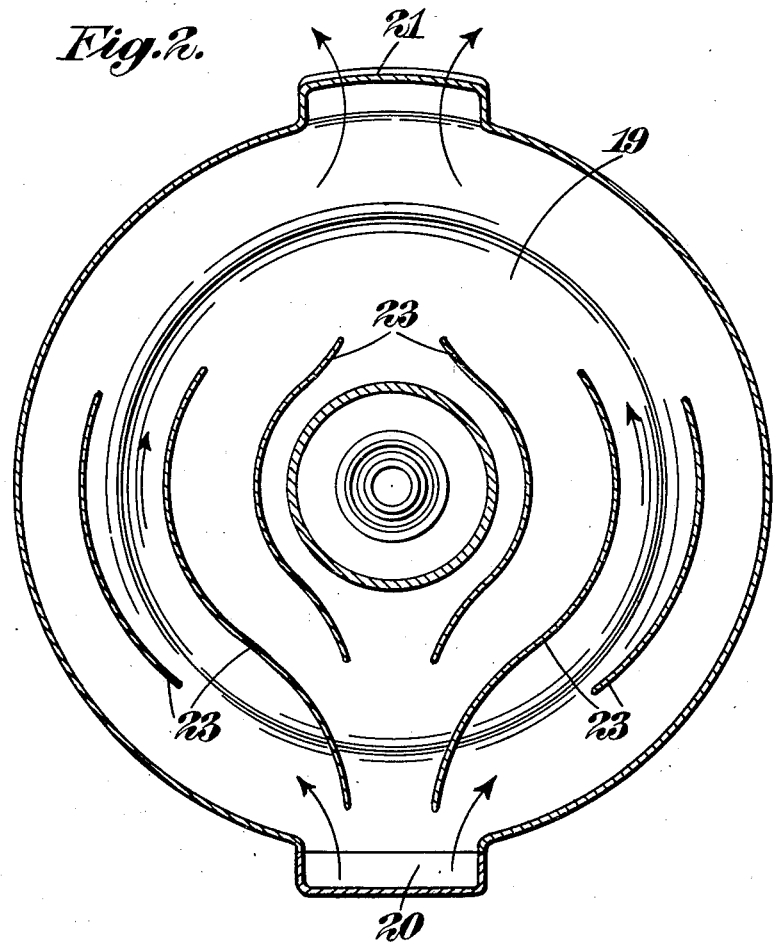
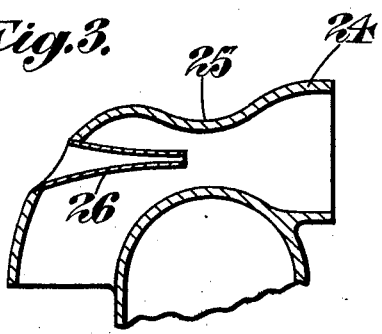
Inventors
Alfred H. R. Fedden
and Leonard F. G. Butler
by Wilkinson & Mawhinney
Attorneys.

Patented Sept. 10, 1935

2,014,317

UNITED STATES PATENT OFFICE 2,014,317

SUPERCHARGED INTERNAL-COMBUSTION ENGINE

Alfred Hubert Roy Fedden and Leonard Frederick George Butler, Bristol, England, assignors to The Bristol Aeroplane Company Limited, Bristol, England, a British company Application August 20, 1934, Serial No. 740,684
In Great Britain September 8, 1933

5 Claims. (Cl. 123—55)

This invention is for improvements in or relating to supercharged internal-combustion engines of the kind in which the casing of a supercharging compressor is attached to the engine crankcase. It is found that, in engines of this kind, heat is transmitted from the crankcase to the compressor so that the air or combustible charge becomes heated prior to its admission to the cylinders with the result that the volumetric efficiency of the engine is impaired. It is the object of the present invention to minimize this disadvantage.

According to the present invention, in a supercharged internal-combustion engine having the casing of the supercharging compressor attached to the engine crankcase, means are provided for heat-insulating the compressor casing from the crankcase for the purpose of preventing the air or charge of fuel and air in the compressor casing from being heated by the crankcase. The casing of the supercharging compressor may be attached to the crankcase and spaced away therefrom so as to provide a chamber for a heat-insulating substance, and means may be provided for producing a flow of cooling air through the said space.

Other features of the invention will be described hereinafter.

A specific embodiment of the invention will now be described by way of example with reference to the accompanying drawings, in which—

Figure 1 is a plan, partly in section, of a radial-cylinder internal-combustion engine of the kind used on aircraft, incorporating the present invention;

Figure 2 is a section corresponding to Figure 1, taken on the line 2—2 of Figure 1, while Figure 3 illustrates an alternative form of air inlet incorporating a fluid extractor.

As shown in Figures 1 and 2, the engine comprises a crankcase 10 with cylinders 11 radiating from it. The front end of the crankcase is formed with the usual nose 12 which houses gearing for the airscrew-shaft.

The rear cover of the crankcase 19, which is shown in section, has a central aperture to support a ball bearing 13 for the crankshaft 14 and mounted immediately behind this rear cover is the casing 15 of a centrifugal supercharging fan 28. The fan 28 draws air in through a conduit 16 into an intake chamber 17 from which it is discharged into a pressure chamber 18 communicating with the cylinders 10 by induction pipes, not shown.

Between the fan casing 15 and the rear cover of the crankcase 10 there is a space 19 in the form of a disc-shaped chamber to which air is admitted by an air intake 20 at the lowest point on the periphery of the chamber and from which air is allowed to escape from an air outlet 21 at the top of the chamber.

It will be seen that when the aircraft is in motion a blast of air will enter the inlet 20 and will be distributed over the whole of the chamber by curved guide vanes 23. In this way heat which would otherwise reach the fan casing 15 is conveyed by the blast of air through the chamber and out through the outlet 21.

The outlet 21 is disposed at a higher point than the inlet 20 and, as a consequence, the flow of air through the chamber is assisted by the tendency of heated air to rise through the chamber.

The air outlet 21 of Figures 1 and 2 may be replaced by that shown diagrammatically in Figure 3. In this case the outlet 24 is formed with a constriction 25 and a converging nozzle 26 enters the wall of the outlet 24 horizontally from the front thereof. When the aircraft is in motion a current of air enters the nozzle 26 and is discharged at high velocity at the constriction 25 whereby a negative pressure is created at this region in known manner and air is sucked out of the chamber. It will be appreciated that any other form of fluid extractor could be used if desired.

We claim:—

1. An internal-combustion engine comprising a supercharging compressor of which the casing is attached to the engine crankcase and is spaced away therefrom so as to form a chamber between it and the crankcase, an air-inlet to the chamber, an air-outlet from the chamber, and means for producing a flow of air into the said inlet, through the said chamber and out through the said outlet.

2. An internal-combustion engine for vehicles comprising a supercharging compressor of which the casing is attached to the engine crankcase and is spaced away therefrom so as to form a chamber between it and the crankcase, an air-inlet to the chamber, an air-outlet from the chamber, a fluid extractor associated with the said outlet and actuated by the movement of the vehicle to draw air through and out of the chamber.

3. An internal-combustion engine for aircraft comprising a supercharging compressor of which the casing is attached to the engine crankcase and is spaced away therefrom so as to form a chamber between it and the crankcase, an air-inlet to the chamber, an air-outlet from the chamber, means for producing a flow of air into the said inlet, through the said chamber and out of the said outlet, and guide vanes within the said chamber to distribute the air over the surfaces to be cooled.

4. A radial-cylinder internal-combustion engine for aircraft comprising a supercharging compressor of which the casing is attached to the engine crankcase coaxially therewith but is spaced away therefrom so as to form a chamber between it and the crankcase, an inlet for cold air to the chamber, said inlet facing the direction of movement of the aircraft, and an air-outlet from the chamber.

5. A radial-cylinder air-cooled internal-combustion engine for aircraft comprising a supercharging compressor mounted co-axially with the engine crank-shaft and having its casing attached to the engine crankcase and spaced away therefrom so as to form a chamber between it and the crank-case, an air-inlet to the chamber, an air-outlet from the chamber, and means for producing a flow of air into the said inlet, through said chamber and out through said outlet.

ALFRED HUBERT ROY FEDDEN.
LEONARD FREDERICK GEORGE BUTLER.